Figure 1:
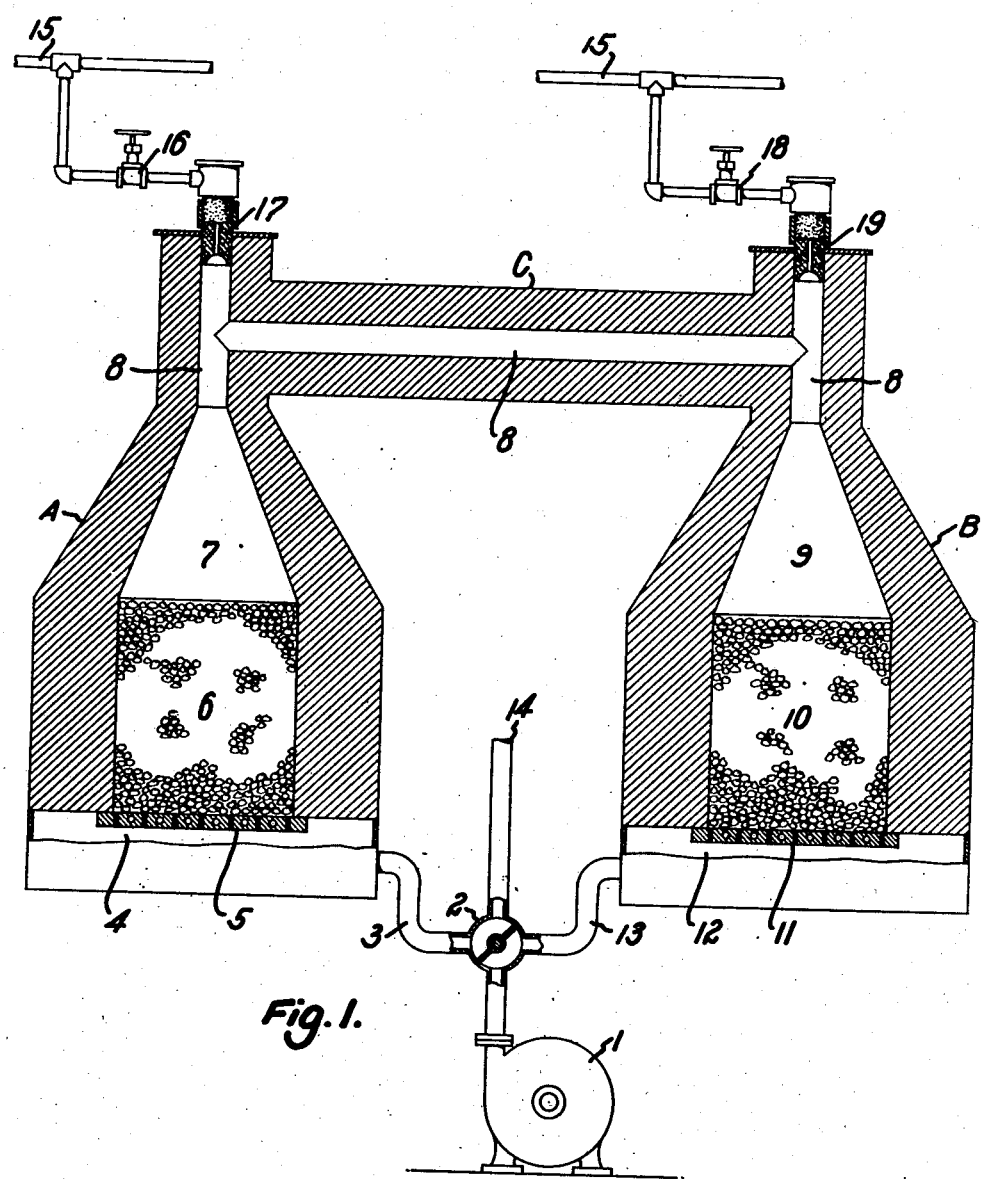

June 10, 1947. F. G. COTTRELL 2,422,081
PROCESS OF PRODUCING NITRIC OXIDE
Filed Oct. 31, 1942 2 Sheets-Sheet 2

Inventor:
Frederick G. Cottrell
By Pierce & Scheffler
his Attorneys.

Patented June 10, 1947

2,422,081

UNITED STATES PATENT OFFICE 2,422,081

PROCESS OF PRODUCING NITRIC OXIDE

Frederick G. Cottrell, Washington, D. C., assignor to Wisconsin Alumni Research Foundation, Madison, Wis., a corporation of Wisconsin Application October 31, 1942, Serial No. 464,072

16 Claims. (Cl. 23—163)

This invention relates to an improved process of and definitive apparatus for effectuating technically important gas reactions progressing favorably at elevated temperatures with the absorption of considerable amounts of heat. It is concerned particularly with the conversion of molecular oxygen and nitrogen into nitric oxide (NO), according to the reaction:

$$N_2 + O_2 \rightleftharpoons 2NO \qquad (1)$$

The formation of nitric oxide from its elements is endothermic, absorbing 46,720 cal./mol. of $N_2$ (1400 B. t. u./lb.) and exhibits equilibrium concentrations of NO from fractional percentages to 7% in the temperature range from 2500° F. to 5000° F. The heat of formation of nitric oxide is small—2,800,000 B. t. u./net ton, which is equivalent to the heat of combustion of 0.47 barrel of fuel oil or of 200 pounds of coal.

The fixation of atmospheric nitrogen in the form of NO at elevated temperatures has long been known. The process has generally been thought of in connection with the electric arc, and has been associated with the consumption of considerable quantities of electric energy. As a matter of fact, the cost of the energy usefully employed in such arc processes has not been particularly high, i. e., 822 kw.h./net ton of NO. Although the cost of this usefully employed electrical energy may be four to five times the cost of the same fuel energy, the technical importance of the difference in cost is not great. It is the energy which is actually consumed in those arc furnaces heretofore employed which has limited the commercial development of this thermal process: the energy introduced in the commercial arc process has ranged from 67,000 to 75,000 kw.h./ton of nitrogen fixed. This amount of energy is some forty times as great as that required by Reaction 1. About 97% of the energy supplied obviously has been wasted merely in heating the unreacted air to arc temperatures and less than 3% has been utilized in supplying the energy actually absorbed in nitric oxide formation.

It was realized early in the development of the arc process that some effective means would be needed to recover a substantial portion of the sensible heat of the unreacted oxygen-nitrogen gases discharged from the reaction zone if the process were to be made industrially competitive except where electric power was abnormally cheap. With this object in view it has been proposed to employ, in conjunction with arc furnaces, regenerators of the type commonly used in blast furnace stoves, open hearth steel furnaces, glass melting tanks, and the like. Unfortunately, the rate at which Reaction 1 progresses both from right to left and from left to right at the temperatures heretofore employed is so rapid that the greater part of the NO formed in the reaction zone would have been decomposed during the process of cooling the reacted gases down to ordinary temperature. In any process for the thermal fixation of atmospheric nitrogen as nitric oxide after the high temperature reaction has progressed to a near approach to equilibrium prevention (as far as possible) of progress of Reaction 1 from right to left during the ensuing cooling of the highly heated gaseous reaction mixture requires that at least over the first few hundred degrees such cooling shall be effected with great rapidity. In many of the actual operations contemplated in the industrial application of the present invention, it is desirable to "quench" or "chill" the reacted gas mixture at rates of cooling ranging from one thousand to a million or more degrees Fahrenheit per second. No such cooling rates, of course, can be carried out in the types of regenerative heat exchangers heretofore employed or suggested for this purpose.

In order to prevent the loss of large fractions of the nitric oxide formed at the furnace temperature, rapid "quenching" is a fundamental necessity. In order to make a reasonable approach to commercially acceptable thermal efficiencies, this rapid quenching must be accomplished without materially increasing the entropy of the system; that is to say, unless the transfer of heat from the effluent gases to the thermal interceptor is carried out with a reasonable approach to isothermal equilibrium, i. e., Second Law efficiency, the heat recovery is irreversible, and cannot be restored to the process by any possible form of recuperator or regenerator.

It is an object of the present invention to provide operative means for the production of nitric oxide at a reduction in cost as compared with the commercially employed prior art processes for the fixation of atmospheric nitrogen as NO.

By the methods of the present invention it is possible to carry out Reaction 1 with percentage efficiencies in the high eighties and nineties. The attainment of such unusual efficiencies is possible through the agency of the highly efficient thermal regenerators herein contemplated. These regenerators exhibit not only a high recovery of heat but as a more important feature recover heat with close approach to thermodynamic reversibility.

According to the present invention, fixation of atmospheric nitrogen as nitric oxide is effected by passing a stream of gas consisting essentially of nitrogen and oxygen, e. g., atmospheric air, or, preferably, an equimolar mixture of nitrogen and oxygen, through the interstices of an assemblage of solid particles of heat-exchanging material (hereinafter more fully described), heated in prior operation to well above 3600° F., whereby the gas is heated to reaction temperature and substantial amounts of NO are formed, and thereafter causing the reacted gas to traverse a second, similar, assemblage of heat-exchanging material in which a gradient of temperature negative with respect to the flow of the gas has been established by prior operation, whereby the gas is rapidly chilled to a lower temperature at which decomposition of NO is negligibly slow. As this described process continues, heat is removed from the first or up-stream regenerator and is transferred to the passing gas stream—substantially all of this transferred heat, except for heat lost through the walls of the apparatus, for heat contained in the exhaust gas and for the heat usefully employed in nitric oxide formation, is re-transferred by the gas to the second or "down-stream" regenerator. That is to say, the isotherms in both regenerators are displaced in the direction of gas flow, causing the temperature of the exhaust gases from the down-stream regenerator to rise progressively during this operation. To prevent excessive heat loss in the exhaust, the direction of flow of the gas through the apparatus is reversed at suitable intervals. The continuous small depletion of heat in the apparatus (due to nitric oxide formation and to loss of heat through the walls and in the exhaust gas) is recompensed by introducing thermal energy into the reaction zone in any convenient form, e. g., as fuel gas, fuel oil, powdered coal, electric energy, or the like. This energy may be introduced either continuously throughout the operation or intermittently as a separate operative step.

The thermal regenerator employed in the present process preferably consists in a chaotically assembled mass of relatively small refractory heat-exchanging particles, e. g., sized and screened particles of common refractory oxides such as $Al_2O_3$, $Cr_2O_3$, $ZrO_2$, $ZrO_2.SiO_2$, CaO, MgO, $MgO.Al_2O_3$ (spinel), and the like. Such masses of heat-exchanging particles are readily traversable by the gases entering and leaving the reaction zone. The interstitial spaces between the refractory particles in the bed constitute fluid channels of small "mean hydraulic radius" (M. H. R.), and exhibit a consequent high coefficient of heat transfer. The tortuous path provided, for the flow of gas, by the geometric configuration of the interstices adds to the turbulence obtaining in the gas stream, thereby increasing the intimacy of thermal contact at the gas-solid interface. Because of the close approach to reversibility attainable, more than eighty per cent of the heat carried from the reaction zone by the exhausting gas can be restored to the process as preheat of the incoming air, with resulting realization of agreeably high over-all thermal efficiency. Reference is made, in this connection, to the employment, in the carrying out of the process of the present invention, of principles of the "Royster pebble stove" as described in Reissue Patent No. 19,757, certain applications of which are further described in my Patent No. 2,121,733.

It is a fortunate circumstance that this type of thermal regenerator exhibits these two concurrent characteristics of high reversability and rapid quenching rates. Without rapid chilling, a large part of the nitric oxide formed is lost through decomposition. Without high reversability, a large part of the heat is lost from the system. Both these requirements must be met in a single apparatus in order to permit technically feasible and, at the same time, economically successful fixation of atmospheric nitrogen.

As will be apparent from the foregoing and from the illustrations which follow, the nitrogen-oxygen mixture which has been heated to a high temperature in passing through the first regenerative—or preheating—bed is, in the intermediate zone, additionally heated by fuel combustion and maintained at optimum reaction temperature during the time of its passage through said intermediate zone. Thereafter, in its passage through the second regenerative—or chilling—bed the resulting highly heated gaseous reaction mixture, containing nitric oxide and the hot products of combustion of fuel from the intermediate reaction zone, is quickly chilled by heat transfer to colder refractory bodies in the chilling bed. The main purpose of using the second regenerative bed is to quickly chill the gas mixture and thus "fix" the NO previously produced. Simultaneously, the second or chilling bed is of course gradually heated by reason of said heat transfer. However, so long as a portion of the second bed remains at a relatively low temperature the bed continues to function as a chilling bed. Reversal of the direction of flow of the nitrogen-oxygen mixture through the apparatus is so controlled as to avoid the complete heating up of the bed which is functioning as the chilling bed.

The following (Illustrations 1 and 2) is a specific description of the operation of the process of the present invention as carried out in the laboratory of the Chemistry Department of the University of Wisconsin by Dr. Nathan Gilbert, under the direction of Prof. Farrington Daniels, at my suggestion and with my co-operation, reference being had to the appended drawing, in which Figure 1 is a diagrammatic representation, with parts in section, of an apparatus employed therein.

Illustration 1

Each of the reaction chambers A and B (of identical construction) consisted in a welded steel shell lined with magnesia refractories. Chambers A and B communicated at their upper ends through a "cross-over" C, similarly formed of a steel shell lined with magnesia refractories, providing the chamber, conduit or open space 8, 8, 8 for passage of gas from A to B, and vice versa. The drawing, although not drawn strictly to scale, does indicate the relative dimensions of the parts A, B and C; viz., the relative height and diameter of the chambers A and B, the thickness of the insulation provided in parts A, B and C and the length of the cross-over. The heat-exchanging bed, 6 or 10, was 13 inches in diameter and exhibited an axial height of 15 inches; it had a volume of about 1.15 cu. ft., and contained about 126 pounds of dead burned magnesite. The average diameter of the particles was 1.5 mm. The volume of the voids in each bed was about 0.42 cu. ft. The volume of open spaces 7 and 9 was 0.422 cu. ft. each, and the volume of cross-over 8 was 0.066 cu. ft., the total vacant volume of 7, 8 and 9 being 0.91 cu. ft.

A motor driven blower 1 forced air through reversing valve 2 into cold blast main 3 and lower open space 4 in reaction chamber A. Air from 4 passed through water-cooled grate mechanism 5 into the mass 6 of heated dead burned magnesite particles and into open space 7. The air heated in transit through 6 traversed cross-over conduit 8 and was discharged into open space 9 above the bed of particles 10 supported by grate 11, both in reaction chamber B. The gases discharged through 11 entered lower open space 12 and discharged from chamber B through conduit 13 and by way of reversing valve 2 departed the apparatus through exhaust main 14, from which it could be received in a nitric oxide recovery system (not shown in the drawing). The operation above described is termed a "direct-flow" step.

At chosen intervals, reversing valve 2 was rotated through a 90° angle. In this circumstance, air from blower 1 entered B, through 13, 12 and 11, passing through 10, 9, 8, 7, 6, 5, 4, 3, in the order named; from 3 it reentered valve 2 and was discharged through 14. This operation is termed a "reverse-flow" step.

Direct- and reverse-flow steps were carried out in continuing alternating succession, intervals between reversals varying in actual practice between 15 minutes and an hour. These intervals can vary between 30 seconds and an hour, depending for instance on such factors as the depth of the beds and the rate of blowing. Thermal energy could be introduced into the apparatus in the form of fluid fuel, e. g., fuel oil, natural gas, manufactured gas, and the like. In the present example, in direct-flow, a controlled volume of 600 B. t. u. fuel gas was forced from fuel main 15 under control of gas valve 16 through gas aperture 17 into open space 8 adjacent chamber A. During reverse-flow, the fuel gas entered open space 8 adjacent chamber B through gas aperture 19, under control of gas valve 18.

The quantity of air forced through the apparatus was from 35 to 38 cu. ft./min., measured at 60° F. at atmospheric pressure. Sufficient fuel gas supplied through 17 during direct-flow and through 19 during reverse flow was burned in spaces 7, 8 and 9 to attain a maximum temperature of 3950° F. The average time of passage of gas from top of bed 6 to top of bed 10 in these circumstances was calculated to be 0.122 second to 0.153 second.

When the temperature of the gas in 7, 8 and 9 was 3800° F. with a flow of 38 cu. ft./min., standard volume, air, in passing upwardly through 6, was heated from 135° F. to 3800° F. in a time interval calculated to be 0.14 second. In transfer to the top of bed 10, the gas was subjected to loss of heat due (1) to the endothermic absorption of heat due to the formation of nitric oxide and (2) to conduction through the refractory walls of 7, 8 and 9. Its heat content was increased by combustion of gas fuel. In a large scale apparatus the loss of heat due to this second cause is minor, but in the apparatus used for this illustration it exceeded the heat absorbed by oxide-formation in a considerable amount.

In the circumstances described, when thermodynamic equilibrium was attained the gas stream should have exhibited an NO content by volume which is 1.8 per cent when calculated from the free energy for Reaction 1 using values for the absolute entropy of $N_2$, $O_2$ and of NO calculated from present spectroscopic data. According to the classical experiments of Jellinek and Finckh (Zeit. anorg. Ch., Vol. 45, page 116, 1905; ibid., Vol. 49, pp. 212, 229, 1906), the observed value as determined in their laboratory apparatus was only 1.45%. The failure of their experimental apparatus to attain better than 80% of thermodynamic equilibrium was due, in part, to the gas being held at reactive temperature insufficiently long to reach this equilibrium value and, in part, to a decomposition of the NO in its transit from the reaction zone in the process of cooling the reacted gas to low temperatures.

In the apparatus described above and shown in Fig. 1 of the drawing, in addition to the just described two factors operating to lower the NO content below its equilibrium value, there was further diminution of nitric oxide content resulting from the unavoidable cooling of the gas below 3800° F. due to the absorption of 18 B. t. u./min. in the formation of 0.013 lb. of NO/min., and of some 1100 B. t. u./min. heat loss by conduction through the refractory walls of 7, 8 and 9. In order to maintain the temperature at 3800°, it was necessary to supply from 3 to 8 cu. ft./min. of manufactured fuel gas through apertures 17 and 18. As a result of the consequent cumbustion of these varying amounts of fuel, the oxygen content of the gas in 9 (on direct-flow) was reduced in varying amounts, with about 11 per cent by volume as a maximum. In the small apparatus described, because of the several factors tending to lessen the NO actually discharged from 14, the maximum NO yield secured was in the range of 0.8 to 0.9%. Because use of the maximum amount of fuel, necessary in view of inadequate insulation of this furnace, greatly depleted the amount of oxygen available for fixation, such maximum yields were secured by bringing the furnace up to maximum temperature and then reducing the amount of fuel addition. In theory, it would have been possible to raise the temperature to open spaces 7, 8 and 9 by increasing the gas flow through apertures 17 and 19, but the increase in heat loss through the walls and the further diminution of oxygen content of the gases due to increased combustion operated to fix an upper limit to the NO content of the gases discharged through exhaust conduit 14.

*Illustration 2*

Higher oxide contents of the gas discharged through 14 more readily were realized by enlarging the dimensions of the apparatus described in Illustration 1. For example, at moderate increase in construction cost the dimensions of beds 6 and 10 were made 18 inches in diameter with an axial height of 22 inches. Such a bed had a volume of 3 cu. ft., and contained about 360 lbs. of dead burned magnesite. The average size of the particles in beds 6 and 10 was made to be through 6 and on 10 mesh Tyler screen without materially impairing the efficiency of the process. With this enlarged bed, the flow of air was increased to a hundred or more cu. ft./min. As a result of the increased flow, the proportional magnitude of the heat losses was reduced and maximum temperatures of 3950–4000° F. were attained. The maximum nitric oxide content of the gases discharged from 14 in working according to this example was about 1.3% by volume. The equilibrium concentration of NO was 2.15%, as calculated from spectroscopic data for a composition corresponding to atmospheric air. The maximum value reported by Jellinek and Finckh was just 2%. The equilibrium value of NO at 3950° F. and 7% oxygen is 1.36% by volume. It must be recognized that considerable uncertainty persists in every effort to determine the temperature of the gas in open spaces 7, 8 and 9 as distinguished from the temperature of the solids adjacent to the spaces. Available thermometric means, e. g., optical pyrometer, reversal of spectral lines, measurement of radiation, etc., succeed in determining only the temperature of the heated solids. Any proper correlation between temperatures actually observed and true gas temperature thus is subject to uncertainty, which appears unavoidable in the present state of the art.

With both of the above described experimental apparatuses the yields of NO varied widely during the cycles due to varying temperatures and oxygen concentrations, and the runs were ultimately terminated in most instances due to mechanical difficulties. However, it is believed that the maximum values cited could be readily maintained in commercial furnaces operating under similar temperature conditions.

When the linear dimensions of the furnace used are increased, the importance of heat losses through the walls diminishes rapidly. In apparatus designed to fix 50 to 100 tons of nitrogen per day, heat loss through the walls becomes less important, and the necessity of distinguishing between solids temperature and reactive gas temperature is minimized.

In order to give some idea as to how the principles tested and demonstrated in the experimental apparatus already described may be extended to larger and more typically industrial sized furnaces, the following description is given:

Illustration 3

Figure 2:
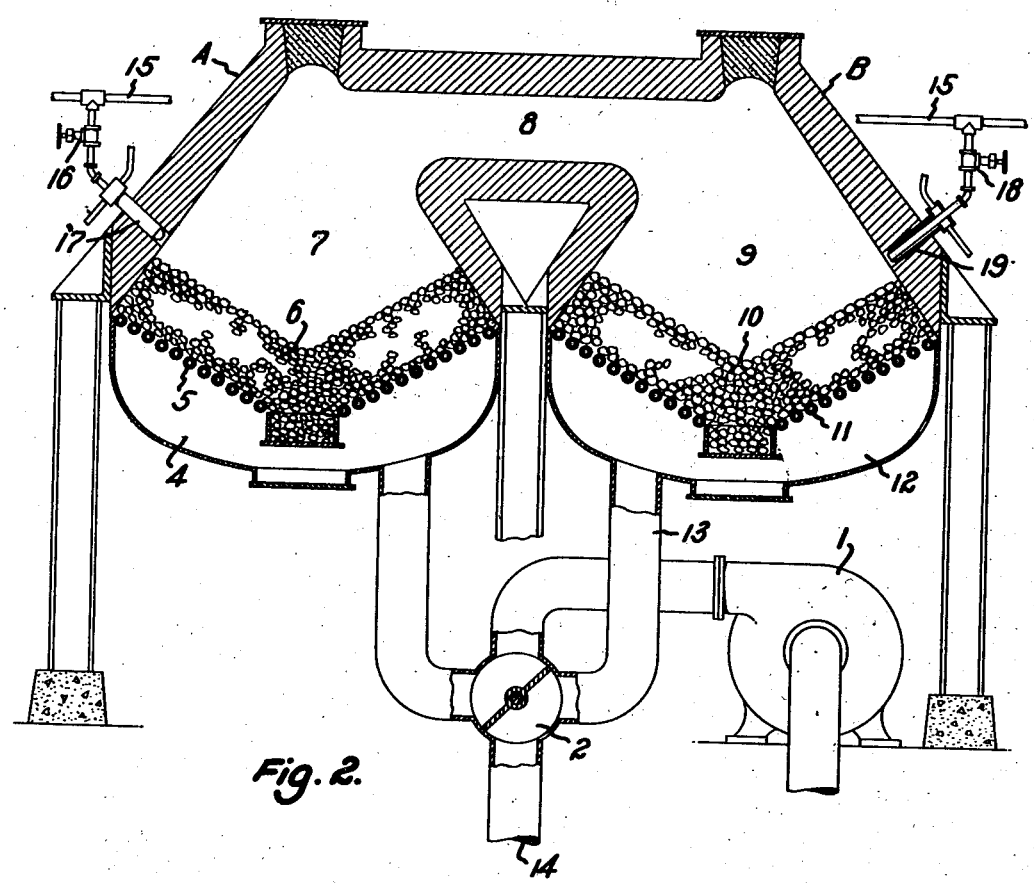

A design of apparatus suitable for use in the fixation of 100 net tons per day of nitrogen in the form of nitric oxide is shown diagrammatically in Fig. 2 of the appended drawing. The several parts of the apparatus in Fig. 2 are marked similarly to those shown in Fig. 1, and the operation of the apparatus as described in Illustration 1 is equally applicable to the present illustration.

The dimensions of the reaction chambers 5 and 6, however, are much larger. The maximum diameter of open spaces 7 and 9 is 22 ft. 6 in. Beds 6 and 10 are dipped from their perimeters to their centers 8 feet, the upper free surface of the beds being inclined to the horizontal by an angle of 35 degrees. The upper surface of each bed is displaced from the grate bars, 5 or 11, a distance of 60 inches measured normally to the grate. The area of the upper surface of each bed is 592 sq. ft.; its volume is 2960 cu. ft., and it contains half a million pounds of dead burned magnesite. The average size of the magnesite particles is 1.66 inches. The volume of open spaces 7 and 9 is 31,900 cu. ft. each and of crossover 8 is 620 cu. ft., the total volume of 7, 8 and 9 being 64,420 cu. ft.

Blower 1, driven by a 2500 H. P. motor, forces 143,000 cu. ft./min. (standard volume) of atmospheric air through valve 2 and inlet 3 during direct flow into chamber 5. At the beginning of this direct step, chambers 7, 8 and 9, including the upper layer of the particles in beds 6 and 10, have been heated in prior operation to 4170° F. In upward transit through bed 6 the entrant air is heated from 60° (initial temperature) to 4160° F., at a space-rate of 69.5° F. per inch. The time rate of temperature change of the gas in the bed at grate 5 is only 7700° F./sec.; as the gas expands due to heating in transit through 6, the velocity of the gas increases from 110 in./sec. at 5 to 1150 in./sec. and its time-rate of heating at the upper surface of 6 is 80,000° F./sec. The time required to complete the final 100° F. temperature rise in bed 6 is 0.0013 second. The average time of transit of the heated gas from the surface of 6 to the surface of 10 is 3.05 seconds.

In its downward transit through bed 10 the gas stream is cooled at a rate initially 80,000° F./sec., a rate which diminishes almost linearly through bed 10 to a final rate of cooling of 7700° F./sec. at grate exhaust. The thermal experience of the air in traversing the pair of reaction chambers A and B in this operative example is as follows: air initially at 60° F. is heated to 4160° F. in a tenth of a second, is maintained at temperature for three seconds, and is returned to a low temperature in a tenth of a second. In other words, the "time at temperature" ("T. A. T.")—i. e., the time at which the gas is maintained at reactive temperature—is thirty times the time required to bring the gas to temperature or the time to return it to low temperature. The total time required to cool the gas from 4160° to below 300° F., say, is without chemical significance, since the rate of decomposition of NO into molecular oxygen and nitrogen diminishes very greatly as the temperature is lowered.

According to experiments by Nernst and by Haber ("Thermodynamics of Technical Gas Reactions," by Fritz Haber, translated by Arthur B. Lamb), the time required to form one-half of the equilibrium oxide concentration is 82 years at 1800° F., and only 30 hours at 2730° F. This half-time requirement decreases to about 120 seconds at 3450° F. and is only 5 seconds at 3800° F.

At the temperature obtaining in 7, 8 and 9 in the present example (4160° F.), 1.3% NO is formed in 0.2 second. At the end of 3.05 seconds—the time at temperature (T. A. T.) of the gas in 7, 8 and 9—the nitric oxide concentration reaches 96% of its maximum attainable value of 2.60% NO, viz., a satisfactory approach to equilibrium concentration.

At thermodynamic equilibrium, and probably a definition of it, the rate of decomposition of NO is equal to its rate of formation. As the gas stream enters bed 10, it is subjected to a cooling rate of the order of magnitude of 80,000° F./sec. It requires .00127 second to cool the gas from 4160° to 4060° F., during which time the NO concentration, which was 2.497% in open space 9, falls to 2.448. During the 0.00131 second required to cool the gas from 4060° to 3960°, the NO decreases to 2.420. In like manner, in the next 100° F. temperature interval, the oxide content is lowered to 2.413. The total time required for the gas to cool from 4160° to 3860° is 0.00392 second. The rapid decrease in the decomposition rate with temperature decrease operates, under conditions of this example, to reduce to a negligible value the amount of further decomposition of NO in cooling from 3800° F. to exit temperature in the further travel of the gas through bed 10. The total further decomposition of NO in reaching the grate 11 in .065 second is less than 0.01% NO. It is seen, therefore, that the adjustment of the T. A. T. and of quenching time resulting from the furnace design shown in Fig. 2 when operated as described is sufficient to form 96% of the equilibrium NO content in the open spaces 7, 8 and 9 and that the recovery of NO with the cooling rate provided is 96.5%, indicating an over-all chemical efficiency of the process as described of 93.5%.

*Illustration 4*

In carrying out the present invention with the apparatus shown in Fig. 2 and described in Illustration 3, greater concentrations of NO in the effluent gas can be obtained by increasing the temperature of open spaces 7, 8 and 9. For example, the following concentrations of nitric oxide are obtainable at thermodynamic equilibrium when atmospheric air is maintained at length at the following temperatures:

| Temperature | 4300° F. | 4500° F. | 4700° F. | 4900° F. |
|---|---|---|---|---|
| NO (% by volume) | 3.00 | 3.45 | 3.94 | 4.42 |
| $N_2$ | 76.55 | 76.33 | 76.08 | 75.84 |
| $O_2$ | 19.47 | 19.25 | 19.00 | 18.76 |

An attempt to attain increased concentrations of NO by thus elevating the temperature of the reaction zone (7, 8 and 9) is not without operative difficulties. On the one hand, the thermal abuse of furnace refractories imposes somewhat severe conditions on the materials of construction and in general operates to limit the maximum temperature which can be employed in any given industrial application of the present invention. In addition to the difficulties involved in maintaining the furnace structure at such temperatures, the rate of progress of Reaction 1 becomes extremely rapid. The increase in reaction rate is desirable in so far as a close approach to equilibrium can be reached in a limited volume of reaction zone, permitting the production of a larger tonnage of nitric oxide per day per cu. ft. of open spaces 7, 8 and 9. At higher temperatures the rate of quenching must be greatly increased in order to minimize the amount of NO decomposition.

To illustrate the quantitative significance of these two operative factors, the dimensions of the apparatus chosen in Illustration 3 may be reduced substantially without loss of oxide tonnage, when operating at higher temperatures. Operation with a reaction temperature of 4500° F. is illustrated. Because of increased NO recovery from the effluent gases, the rate of flow of air from blower 1 is less than the 143,000 cu. ft./min. in Illustration 3, i. e., only 115,000 cu. ft./min. (standard) of atmospheric air. The maximum diameter of beds 6 and 10 is reduced to 12 ft. 8 in., and while retaining the 35 degree angle of dip of the upper surface from perimeter to axis, the depth of the bed at right angles to its upper free surface is 24 inches. The total height of open space 7 (or 9) is 10.5 ft. With this construction, the volume of beds 6 and 10 is 252 cu. ft. containing 42,200 lbs. of refractory particles. The total volume of open spaces 7, 8 and 9 is 1150 cu. ft. The time required to transfer gas from the upper surface of 6 through 7, 8 and 9 to the upper surface of 10 is .0846 second. At 4500° F., the time required for NO concentration to reach one-half its equilibrium value is 0.0026 second. In the 0.085 second of its transit through the reaction zone, 98.5% of equilibrium NO concentration is realized, e. g., 3.41% NO in the gas entering bed 10. With reduced section of flow through the beds of particles and with the reduced length of path through these beds, the rate of change of temperature of the gas in flowing downwardly through bed 10 during direct flow is at the rate of 550,000° F./sec.

In spite of this increased rate of "quenching," substantial amounts of the NO formed in the reaction zone are decomposed according to Reaction 1 read from right to left. For example, in its transit through the upper .053 inch of bed 10, requiring .000164 second, the NO concentration of the gas decreases from its reaction zone value of 3.41% to 3.33%. In its traverse through the next .053 inch of bed 10, decomposition of NO occurs at a slower rate, resulting in a decrease from 3.33% to 3.28% NO. When the gas has reached 3800° F., the relative sluggishness of NO decomposition is sufficient to prevent more than a technically negligible amount of further decomposition during the further cooling of the reaction mixture.

It should be observed that the thermal efficiencies of the operations described in Illustration 3 and in Illustration 4 are essentially identical. So far as concerns the manufacture and recovery of NO in the present process, it is largely a matter of indifference how much NO is formed in the reaction zone, except in regard to the single item of the cost of blowing work required to force the gases through the apparatus. Fuel oil through apertures 17 and 19 is supplied in amounts sufficient to recompense the process for heat (1) absorbed endothermically in forming nitric oxide and (2) lost through the furnace walls and grate bars. Since this second item is small with the equipment described in Illustrations 3 and 4, the cost of fuel is substantially proportional to the amount of NO formed. When small concentrations of NO are produced at relatively low reaction temperatures, the quantity of fuel supplied to the reaction zone is proportionately small: with higher reaction temperatures higher concentrations of NO are formed and recovered but proportionately larger quantities of fuel are required. The heating value of the fuel used exceeds the heat of formation of the NO formed by only 10 to 20%. The result is that the fuel per ton of nitric oxide is substantially constant and its proportion of the total cost of production becomes relatively insignificant.

In regard to the work required of blower 1 this is not the case in practice. In general, of course, the cross-sections of beds 6 and 10 exposed to gas flow may be made very large and the drop in pressure experienced by the gas in traversing the apparatus very small. In actual furnace design, however, the cross-section of the bed may be limited by practical considerations.

As was mentioned at the outset, the process of the invention is applicable to production of NO from other mixtures of $O_2$ and $N_2$ than that represented by atmospheric air. It may, with favorable results, use a mixture of air and added oxygen, and the amount of oxygen so added may be sufficient to produce a mixture wherein oxygen and nitrogen are present in equimolecular quantities or in any proportion representing an enhancement of atmospheric air's normal content of oxygen. The optimum oxygen content of the entrant gas mixture is sufficiently above 50% volume to permit oxidation of the fuel introduced and exhibit a residual oxygen content equal to the nitrogen content. The determining factor in enriching the air with oxygen is the cost of the oxygen.

Whereas the simplest and, in general, cheapest construction of the regenerators is an assembled mass of discrete particles, other forms of regenerator construction are permissible provided they exhibit the thermodynamic characteristics of the "pebble bed" hereinbefore described. Any form of refractory shapes which provide a large number of fluid channels with acceptably small mean hydraulic radius and which promote the necessary turbulence in the gas stream—e. g., molded refractory blocks provided with a multiplicity of small, preferably tortuous, channels—exhibit a high heat efficiency and will serve. The performance of such regenerator masses seldom exceeds that of the structures given in the preceding illustration and their high cost and the difficulty of cleaning and/or replacing them make them less desirable than the pebble type of filling.

It will be appreciated that the size of the particles constituting the heat-exchange beds may vary between the size of sand grains and pebbles (or equivalently shaped bodies) having an average diameter of one inch or even larger, e. g., diameters up to two inches. As shown in the foregoing examples the particles may have average diameters of, for instance, 1⅔ inches down to 1.5 mm., the relative surface area exposed being inversely proportional to the diameter as shown in the following table of approximate surface-size relationships per 1 cu. ft. of bed for the various sized particles (considered as spheres) specifically referred to above:

| | Sq. ft. |
|---|---|
| 2" spheres | About 22 |
| 1⅔" spheres | About 26 |
| 1" spheres | About 43 |
| 6 mesh Tyler | About 334 |
| Through 6 on 10 mesh Tyler | About 428 |
| 10 mesh Tyler | About 720 |
| 1.5 mm | About 730 |

In the preceding illustrations, the reaction zone includes, in addition to the upper parts of the pebble beds, the enclosed insulated empty space (7, 8 and 9) intermediate said pebble beds. The heat involved in NO formation is chiefly supplied to the gas stream in this empty space by the very small fraction of black body radiation, from the inner wall of the chamber, which is absorbed by polar molecules such as $H_2O$ and $CO_2$ derived from the initial air, from the fuel and, to some extent, by the NO molecule itself. An enhanced transfer of heat to the gas stream may be attained by filling spaces 7, 8 and 9 with relatively large lumps of refractory material thereby protecting the gas from temperature drop. This scheme has advantages when very high reactive temperatures are being used and when high concentrations of NO are being formed, or when the supporting effect of such large lumps is to be utilized to prevent mechanical collapse of the upper refractory lining. Such a filling decreases the "T. A. T." in chambers 7, 8 and 9 to, say, one-third. At low temperatures, where extended "T. A. T." is required, the linear dimensions of 7, 8 and 9 become so large that much of the attractiveness of this scheme vanishes.

When operating with high reactive temperatures where rapid quenching is required—which is realized with high rates of flow through the regenerator and by employing small particles—the upward force of the air stream may exceed the gravitational force acting on the particles and tend to lift the particles from the bed. When such design becomes necessary, a layer of larger particles, or lumps, is superposed on the bed per se, to prevent undesirable movement of the latter.

I claim:

1. In the process of producing nitric oxide from gaseous mixtures of nitrogen and oxygen which involves heating such nitrogen-oxygen mixture to a high temperature at which nitrogen and oxygen react to form nitric oxide and thereafter cooling the resulting gaseous reaction mixture, the improvements which consist in cooling the highly heated gaseous reaction mixture from reaction temperature to a temperature at which the rate of decomposition of nitric oxide is slower than 10% per second of the amount of NO present in the gas mixture at top temperature in a time interval of not to exceed 0.1 second by forcing the highly heated gaseous reaction mixture through interstices through a gas-traversable bed of refractory bodies having average diameters not exceeding 2 inches, a part of which bed is at a temperature at which nitric oxide is stable, the refractory bodies of said bed being so selected as to shape, size and composition as to give tortuous interstitial channels of such small mean hydraulic radius that turbulent flow and quick cooling of the gas passing therethrough are provided and decomposition of the nitric oxide content of the gaseous reaction mixture to more than a minor extent is prevented, and recovering nitric oxide so produced.

2. Process of producing nitric oxide from a gas mixture essentially consisting of nitrogen and oxygen which comprises heating a gas-traversable bed of refractory elements so selected as to composition, shape and size below 2 inches average diameter and so disposed in the bed as to present more than 22 square feet of surface area per each cubic foot of volume of said bed to an elevated temperature at which nitrogen and oxygen react to form nitric oxide, forcing the gas mixture through tortuous interstitial channels of small mean hydraulic radius between said refractory elements in intimate heat-exchanging relation with said elements and thence through an insulated reaction space, during which passage the gas mixture is heated to reactive temperature and a substantial amount of nitric oxide is formed in the heated gas mixture, forcing the resulting highly heated gaseous reaction mixture through tortuous interstitial channels of a second and similar bed a part of which is initially at a temperature at which nitric oxide is stable, the interstices through said second bed exposing such surface in contact with and producing such turbulence in the gaseous reaction mixture and the rate of movement of the gaseous reaction mixture being so adjusted that the latter in passage therethrough is cooled to such stable temperature at an initial rate of cooling substantially in excess of 10,000° F. per second and sufficiently high with respect to the rate of decomposition of the nitric oxide that no more than a minor portion of the nitric oxide formed is decomposed during the passage of the gaseous reaction mixture through said second bed, and recovering nitric oxide so produced.

3. The process defined in claim 1, according to which the over-all volume of the bed is not more than one-fifth the volume of the gas mixture, measured at standard conditions, forced therethrough per minute.

4. In the process of producing nitric oxide from gaseous mixtures essentially consisting of nitrogen and oxygen which involves heating such nitrogen-oxygen mixture to a high temperature at which nitrogen and oxygen react to form nitric oxide and thereafter cooling the resulting gaseous reaction mixture, the improvements which consist in forcing the highly heated gaseous reaction mixture through interstices through a gas-traversable pebble bed consisting of a mass of chaotically disposed relatively small refractory particles, a part of which pebble bed is at a temperature at which nitric oxide is stable, the interstices through said bed exposing such surface in contact with and producing such turbulence in the gaseous reaction mixture that the latter during passage therethrough is cooled, in a time interval of not to exceed 0.1 second, from reaction temperature to a temperature at which the rate of decomposition of nitric oxide becomes negligibly slow in the further passage of the gaseous reaction mixture through the bed, and recovering nitric oxide so produced.

5. In the process of producing nitric oxide from gaseous mixtures of nitrogen and oxygen which involves heating such nitrogen-oxygen mixture to a high temperature at which nitrogen and oxygen react to form nitric oxide and thereafter cooling the resulting gaseous reaction mixture, the improvements which consist in cooling the highly heated gaseous reaction mixture, in a time interval of not to exceed 0.1 second, from maximum reaction temperature to a temperature at which the rate of decomposition of nitric oxide becomes negligibly slow, by forcing the highly heated gaseous reaction mixture through a gas-traversable bed, a part of which is at a temperature at which nitric oxide is stable, composed of chaotically disposed refractory bodies, not greater than 2 inches average diameter, so selected as to size and in such arrangement as to give tortuous interstitial channels of such small mean hydraulic radius that turbulent flow and quick cooling of the gas passing therethrough are provided and decomposition of the content of nitric oxide to more than a minor extent is prevented, and recovering nitric oxide so produced.

6. In the process of producing nitric oxide from gaseous mixtures of nitrogen and oxygen which involves heating such nitrogen-oxygen mixture to a high temperature at which nitrogen and oxygen react to form nitric oxide and thereafter cooling the resulting gaseous reaction mixture, the improvements which consist in cooling the highly heated gaseous reaction mixture, in a time interval of not to exceed 0.1 second, from maximum reaction temperature to a temperature at which the rate of decomposition of nitric oxide becomes negligibly slow, by forcing the highly heated gaseous reaction mixture through interstices through a gas-traversable bed of chaotically disposed refractory bodies having an average diameter not exceeding 1 inch, a part of which bed is at a temperature at which nitric oxide is stable, the refractory bodies of said bed being so selected as to shape and size as to provide tortuous interstitial channels of such small mean hydraulic radius that turbulent flow and quick cooling of the gas forced therethrough are provided and decomposition of the content of nitric oxide to more than a minor extent is prevented, and recovering nitric oxide so produced.

7. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle, during which step the gas mixture is heated and simultaneously the refractory bodies are cooled, in the intermediate zone supplying heat for endothermic reaction, and in said chilling zone passing the gas mixture through the interstices of a bed of refractory material cooled by a previous cycle, during which step the gases are rapidly cooled to an NO-stable temperature by transfer of heat to the refractory bodies, reversing the order of passage of the mixture through said beds in alternate cycles, said beds being chaotically disposed bodies of refractory material.

8. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle, in the intermediate zone supplying heat for endothermic reaction, and in said chilling zone passing the gas mixture through the interstices of a bed of refractory material cooled by a previous cycle, reversing the order of passage of the mixture through said beds in alternate cycles, said beds being chaotically disposed bodies of refractory material presenting at least 22 sq. ft. of surface area per cu. ft. of volume of the beds.

9. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle in the intermediate zone supplying heat for endothermic reaction, and in said chilling zone passing the gas mixture through the interstices of a bed of refractory material cooled by a previous cycle, reversing the order of passage of the mixture through said beds in alternate cycles, said beds being chaotically disposed bodies of refractory material of a screen size between 10 mesh Tyler and 2 inches diameter.

10. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle, in the intermediate zone supplying heat for endothermic reaction, and in said chilling zone passing the gas mixture through the interstices of a bed of refractory material cooled by a previous cycle, reversing the order of passage of the mixture through said beds in alternate cycles, said beds being chaotically disposed bodies of refractory material of a screen size between 10 mesh Tyler and 2 inches diameter and presenting at least 22 sq. ft. of surface area per cu. ft. of volume of the beds.

11. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle, in the intermediate zone supplying heat for endothermic reaction, and in said chilling zone passing the gas mixture through the interstices of a bed of refractory material cooled by a previous cycle, reversing the order of passage of the mixture through said beds in alternate cycles, said beds being chaotically disposed bodies of refractory material so selected as to size that the average of the diameters of spheres equivalent in volume to each of the refractory bodies is no greater than 2 inches.

12. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle, in the intermediate zone supplying heat for endothermic reaction, and in said chilling zone passing the gas mixture through the interstices of a bed of refractory material cooled by a previous cycle, reversing the order of passage of the mixture through said beds in alternate cycles, said beds being chaotically disposed bodies of refractory material which have a mean volume no greater than that of a sphere 2 inches in diameter.

13. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle in the intermediate zone supplying heat for endothermic reaction, and in said chilling zone passing the gas mixture through the interstices of a bed of refractory material cooled by a previous cycle, reversing the order of passage of the mixture through said beds in alternate cycles, said beds being chaotically disposed bodies of refractory material of a screen size between 10 mesh Tyler and 2 inches diameter and said intermediate heating zone being filled with relatively large refractory chunks.

14. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle, in the intermediate zone supplying heat for endothermic reaction by introducing and burning a fluid fuel in the preheated gas mixture therein, and in said chilling zone passing the gas mixture through the interstices of a bed of refractory material cooled by a previous cycle, reversing the order of passage of the mixture through said beds in alternate cycles, said beds being chaotically disposed bodies of refractory material.

15. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle in the intermediate zone supplying heat for endothermic reaction, by introducing and burning a fluid fuel in the preheated gas mixture therein, and in said chilling zone passing the gas mixture through the interstices of a bed of refractory material cooled by a previous cycle, reversing the order of passage of the mixture through said beds in alternate cycles, said beds being chaotically disposed bodies of refractory material of a screen size between 10 mesh Tyler and 2 inches diameter.

16. A method of producing nitric oxide from a gas mixture essentially comprising nitrogen and oxygen, which comprises the steps of passing said mixture through a preheating zone, an intermediate heating zone, and a chilling zone, in the preheating zone passing the mixture through the interstices of a bed of refractory bodies heated by a previous cycle in the intermediate zone supplying heat for endothermic reaction, by introducing and burning a fluid fuel in the preheated gas mixture therein, and in said chilling zone passing the gas mixture through the interstices of a bed of refractory material cooled by a previous cycle, reversing the order of passage of the mixture through said beds in alternate cycles, said beds being chaotically disposed bodies of refractory material of a screen size between 10 mesh Tyler and 2 inches diameter and said intermediate heating zone being filled with relatively large refractory chunks.

FREDERICK G. COTTRELL.

REFERENCES CITED

The following references are of record in the file of this patent:

UNITED STATES PATENTS

| Number | Name | Date |
|---|---|---|
| 777,485 | Pauling | Dec. 13, 1904 |
| 2,121,733 | Cottrell | June 21, 1938 |
| Re. 19,757 | Royster | Nov. 12, 1935 |
| 2,272,108 | Bradley | Feb. 3, 1942 |

FOREIGN PATENTS

| Number | Country | Date |
|---|---|---|
| 26,499 | Great Britain | 1913 |
| 3,194 | Great Britain | 1913 |

OTHER REFERENCES

The Nitrogen Industry, by Partington & Parker, Constable, London, 1922, pages 233–238.